(12) United States Patent
Lohan et al.

(10) Patent No.: US 8,757,984 B2
(45) Date of Patent: Jun. 24, 2014

(54) METHOD FOR POSITIONING A HYDRAULIC ACCUMULATOR ON A WIND-POWERED ELECTRIC GENERATOR

(75) Inventors: Martin E. Lohan, Palm City, FL (US); Joseph W. Nalder, Morgan, UT (US)

(73) Assignee: Inventus Holdings, LLC, Juno Beach, FL (US)

( * ) Notice: Subject to any disclaimer, the term of this patent is extended or adjusted under 35 U.S.C. 154(b) by 647 days.

(21) Appl. No.: 13/024,508

(22) Filed: Feb. 10, 2011

(65) Prior Publication Data
US 2012/0207597 A1    Aug. 16, 2012

(51) Int. Cl.
*F03D 11/00* (2006.01)

(52) U.S. Cl.
USPC ...................................... 416/244 R; 415/232

(58) Field of Classification Search
None
See application file for complete search history.

(56) References Cited

U.S. PATENT DOCUMENTS

| | | | |
|---|---|---|---|
| 4,715,782 A | | 12/1987 | Shimmel |
| 4,792,281 A | * | 12/1988 | Coleman ........................ 416/156 |
| 8,186,956 B2 | | 5/2012 | Numajiri et al. |
| 2010/0232964 A1 | * | 9/2010 | Geiger ........................... 416/156 |
| 2011/0020136 A1 | * | 1/2011 | Numajiri ........................ 416/246 |
| 2011/0280730 A1 | * | 11/2011 | Numajiri et al. ........... 416/204 R |

OTHER PUBLICATIONS

"Supports for Hydraulic Accumulators;" HYDAC International; Mar. 23, 2010; pp. 227-232.
"Bladder Accumulators Standard;" HYDAC International; Feb. 24, 2008; pp. 1-7.
"Components, Systems and Service for Wind Turbines;" HYDAC International; Aug. 1, 2008; pp. 1-8.
"Wind Power Accumulators;" The Professional Choice in Fluid Energy Management; Olaer Group; Jan. 1, 2010; pp. 1-8.

* cited by examiner

*Primary Examiner* — Richard Edgar
(74) *Attorney, Agent, or Firm* — Feldman Gale, P.A.; Rafael Perez-Pineiro; Michael C. Cesarano

(57) ABSTRACT

A method of minimizing the flow of hydraulic fluid within a hydraulic accumulator mounted in the rotating hub of a wind turbine comprises mounting the accumulator within the hub such that the longitudinal axis of the accumulator is substantially parallel with the axis of rotation of the hub.

7 Claims, 3 Drawing Sheets

METHOD FOR POSITIONING A HYDRAULIC ACCUMULATOR ON A WIND-POWERED ELECTRIC GENERATOR

BACKGROUND OF THE TECHNOLOGY

Wind-powered electric generators convert the movement of air into electricity by using the air movement to rotate aerodynamically shaped blades oriented to the airstream. The blades are mounted through a gearing system to an electrical generator which produces electric power. Although some models operate at constant speed, more energy can be collected by variable-speed turbines which use a solid-state power converter to interface to the transmission system.

Most wind turbines are horizontally oriented. In order to extract a maximum amount of power at any given airspeed, i.e., the speed with which the air is moving past a stationary point on the wind generator, the blades and their orientation to the airstream must be constantly reconfigured to cause the relative wind to encounter the blade at a predetermined optimal angle of attack. This is normally done by changing the pitch of the blade as the air flow increases or decreases, or as the direction from which it is coming varies. The blades, typically three to a wind turbine, are attached to a rotating hub which is centered at an end of a nacelle. The nacelle may include gearing and clutch components configured to drive an electrical generator at a more or less constant speed regardless of the wind speed or rotational angular velocity of the hub.

The method of varying blade pitch is particularly advantageous in capturing wind power during operation under light to medium air flow conditions. However, occasionally the wind speed may be so high as to exceed the design capacity of the turbine or associated electric generator. Under such conditions, it may be desirable to vary the blade pitch to cause the blade to rotate at slower angular velocities than the theoretical maximum that could be reached. In the event of a mechanical failure, it may be necessary to slow or fully stop rotation of the blade. One way of slowing or stopping the rotation of a blade is to vary the pitch of the blade such that air passing over the blade ceases to create lift. This may be accomplished either by positioning the blade at an angle to the relative wind as to "feather" the blade (an angle at which the forces generated at either side of the blade neutralize one another), or by positioning the blade at such an extreme angle to the relative wind as to cause the blade to stall.

The blades attached to the wind turbine typically have lengths ranging between 30-40 meters, and rotate at 10-22 revolutions per minute, developing speeds at the blade tips of up to 91 m/s. The force that a moving air mass exerts upon such blades can be considerable, and the control mechanisms needed to hold a blade at a given angle during operation must be rugged and reliable. Hydraulic actuators are normally used to vary the pitch of a wind turbine blade. The actuators are situated within the rotating hub having one end affixed to a hard point on the hub and the other being affixed to a point on the blade whereby extension or compression of the actuator will cause the blade to rotate about its longitudinal axis, thereby varying the angle of attack with the relative wind. Being mounted in the hub of the turbine, the actuators are subjected to extreme forces and vibration generated as the hub is turning. When used for pitch control, the actuators are working virtually all the time the hub is turning, adjusting the blades numerous times every minute. The same actuators are used to supply power for an emergency stop.

During normal operation within a normal operating range, varying the pitch of a blade will be sufficient to maintain its rotational speed within design limits. However, if conditions should develop in which normal design limits are being exceeded, e.g., extraordinary wind velocities caused by microbursts or downdrafts associated with extreme weather conditions; or mechanical failure of a turbine shaft or gearing mechanism; or the dropping of electrical load through a broken line or other electrical anomaly, then the normal electrical or mechanical load being carried by the wind turbine may be lost, and the blade may start to spin out of control. Such a condition, if allowed to develop, has the potential to cause catastrophic failure of the entire wind turbine and its associated mechanical supporting structure. To prevent this kind of catastrophic failure, the same hydraulic actuators that control the pitch of turbine blades during normal operation, are also used to automatically move a blade to a predetermined angle upon the loss of hydraulic power or control mechanisms.

Hydraulic systems used in wind turbine generators typically operate at pressures about 180 to 200 bar (about 2600-3000 psi). System pressure is maintained with electrically driven hydraulic pumps. However, in the event of hydraulic failure, such as the failure of a pump, residual hydraulic power may be temporarily stored for a limited time in hydraulic accumulators integral to the system. Hydraulic accumulators are well known, and operate by storing a compressed gas, usually nitrogen, within a non-gas-permeable bladder surrounded by a volume of hydraulic fluid, all of which is contained within a rigid canister. During installation or maintenance, the bladder will first be filled with gas to a pressure of 110 bar (about 1600 psi). Then, hydraulic fluid will be introduced into the canister and brought up to system pressure. Since the system pressure is greater than the initial bladder pressure, the gas in the bladder will compress until, according to Boyle's law, the decrease in the volume of the gas has caused the pressure within the bladder to rise until it is the same as the hydraulic system pressure. The bladder is compressed from all directions, and may take on the shape of a wrinkled raisin, or possibly a starburst.

The compressed gas acts as a damper to shocks that may occur in the hydraulic system during normal operation; and, should a hydraulic pump fail and the system lose pressure, the pressurized gas will expand within the bladder, forcing hydraulic fluid out of the canister and into the system to create sufficient hydraulic pressure to activate emergency systems, such as shutdown pitch control actuators. Because hydraulic actuators are used in hydraulic systems that control blade pitch, they are located in the hub, and are subject to the rotational forces and related consequences present within a rotating hub.

A known problem with emergency shutdown systems is that the flexible non-gas-permeable bladders used in hydraulic accumulators have a relatively short lifespan with respect to other components used in wind turbine electrical generators. If a bladder should be breached, that failure results in a potentially unsafe condition—loss of emergency hydraulic power—that could allow a non-critical failure of a hydraulic pump to rapidly escalate into a catastrophic failure that could destroy an entire unit. Thus, whenever the bladder in an accumulator fails, the unit must be shut down and the hub disassembled sufficiently that the accumulator can be replaced. Such shutdowns are wasteful, costly, and inefficient. Accordingly, what is needed is a system whereby the service life of a non-gas-permeable bladder in a hydraulic accumulator may be significantly extended without compromising the safety or integrity of the unit in which it is installed.

SUMMARY OF THE INVENTION

This invention is a system and method for mounting hydraulic accumulators whereby the service life of the accumulator and its component parts may be extended without compromising safety or the integrity of the wind powered turbine unit.

Studies have shown that hydraulic accumulators have traditionally been rigidly mounted within the hub of a turbine without special consideration having been taken of the location or orientation of the accumulator. As the hub turns, the accumulator is moved in a circular track about the rotational axis of the hub. Hydraulic fluid in the accumulator is also subject to rotational, centrifugal, and gyroscopic forces normally attendant to objects being subjected to rotational movement. In the case in which the long axis of the accumulator is oriented in a direction other than parallel to the axis of rotation, rotational, centrifugal, and gyroscopic forces, and the coriolis effect (also known as "coriolis force") associated with rotating bodies, cause the hydraulic fluid to move about within the canister. Constant rotation of the hub causes the hydraulic fluid to take on rotational and other movement that impacts the bladder, causing it to flex and twist within the canister, ultimately compromising its integrity. Over time, the constant flexion and twisting weakens the fabric of the bladder, causing premature failure and creating a breach whereby fluid can enter the bladder and gas is released into the canister. In this condition, the hydraulic system is compromised and actuators within the system may fail to function properly. Moreover, the accumulator is unable to perform its emergency function in the event of a loss of a hydraulic pump, and must be replaced.

In this invention, accumulators are positioned within the hub so that their longitudinal axes are parallel to the axis of rotation of the hub. If the geometry and design of the hub is such that absolute parallelism cannot be achieved, the forces of hydraulic fluid upon the bladder can be significantly reduced, and the service life of the bladder can be correspondingly increased, by aligning the axes of the accumulators to be as close to parallel to the axis of rotation as is practicable within the installation. Accumulators mounted at angles of up to about 30 degrees removed from the axis of rotation will receive some benefit in reducing wear and tear on internal bladders. However, the closer to zero degrees that an installation can achieve, the greater the longevity of the bladder will be. At angles of up to 30 degrees, even if the rotation of hydraulic fluid within a canister cannot be totally suppressed, the forces causing it to circulate can be substantially reduced within the canister. However, the closer to parallel to the axis of rotation that the accumulators can be mounted, the more the forces acting on the fluid to cause circulation will be negated, with a corresponding increase in the service life of the bladder.

A second, significant factor related to forces (or effects) causing hydraulic fluid to circulate within an accumulator is the distance from the axis of rotation that the accumulator is mounted. In this regard, centrifugal effects acting on a rotating system, such as within the hub of a wind turbine generator, increase in proportion to the distance from the axis of rotation and also as the square of the rate of rotation. This phenomenon has the effect of forcing fluid away from the axis of rotation, and contributes to circulation of fluid within the canister. Thus, in order to minimize centrifugal effects, accumulators should be mounted as close to the axis of rotation as is practicable.

DETAILED DESCRIPTION OF THE PREFERRED EMBODIMENTS

The flows of hydraulic fluid depicted in the figures are conceptual rather than actual, and are representative of random circulation patterns within a cylinder having a pressurized, flexible bladder occupying much of its interior. The salient point is that flows caused by rotational movement of a cylinder in which the axis of rotation is not parallel to the axis of the cylinder follow circulation patterns in which the bladder will be subjected to flow impact and twisting torques that weaken the resilience of the bladder and cause it to fail prematurely.

Figure 1:
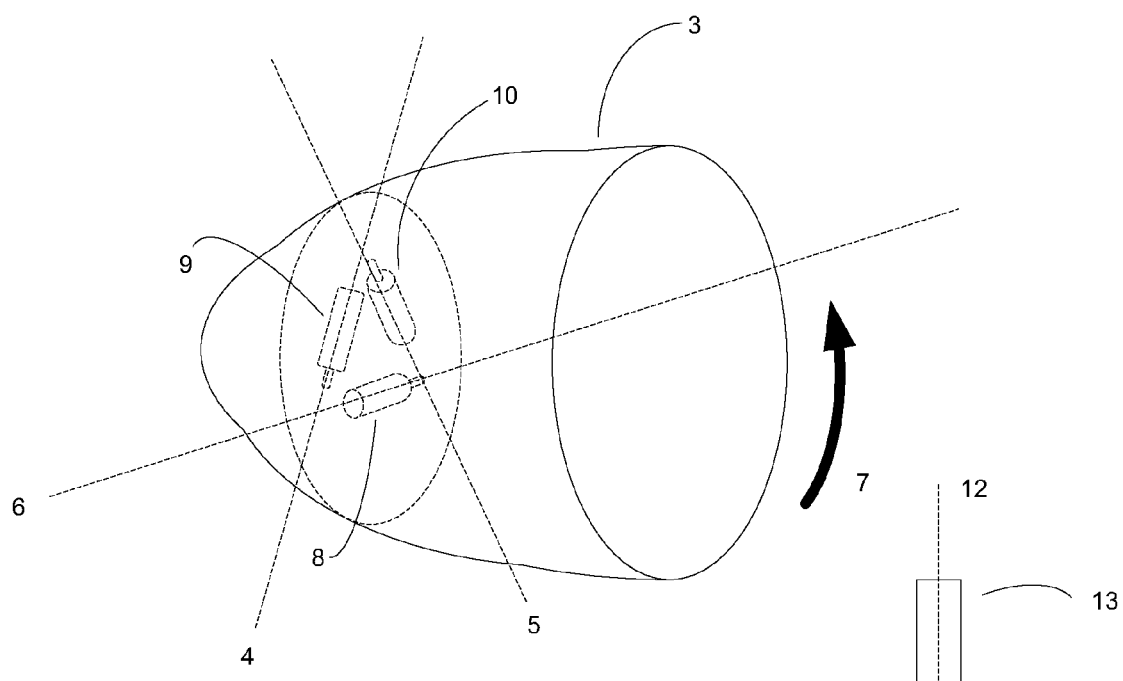
FIG. 1 is a prior art drawing showing a typical orientation of hydraulic accumulators mounted within a rotating hub, and whose longitudinal axes are oriented within the plane of rotation of the rotating hub.
Figure 2:
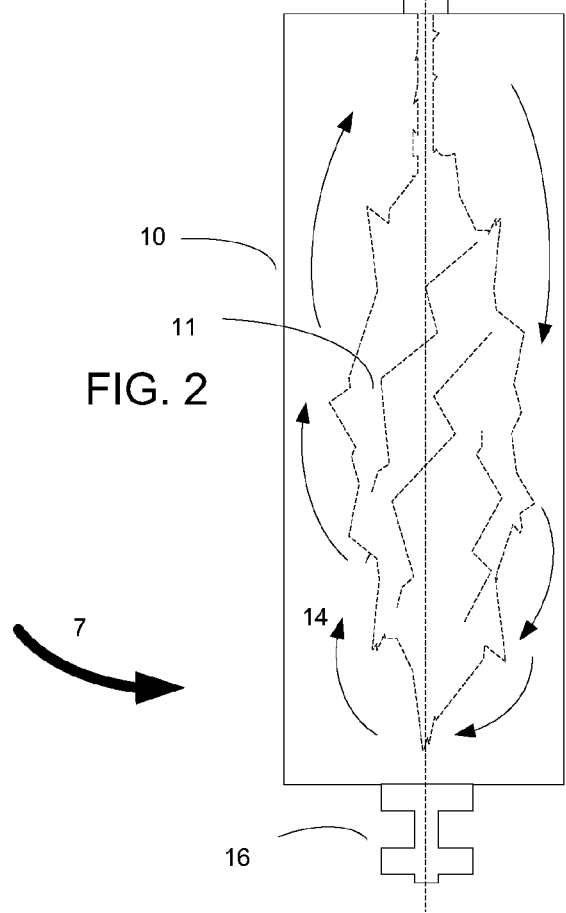
FIG. 2 shows internal fluid movement within a hydraulic accumulator of FIG. 1.

FIG. 1 illustrates a typical prior art mounting of a hydraulic accumulator on the hub of a wind turbine 3. In FIG. 1, three accumulators 8, 9, and 10 are mounted end-to-end to form a pattern in which each accumulator forms a side of an equilateral triangle. The axes of the accumulators are indicated by dashed lines 4, 5, and 6. The accumulators are mounted in a plane that is perpendicular to the axis of rotation of the hub and rotate as the hub rotates. During normal operation the accumulator shown in FIG. 2 is fluidly connected to the hydraulic system through pipes (not shown) and a valve 16, and hydraulic fluid 14 will be in fluid communication with the rest of the system. The accumulators provide power for emergency stopping (or feathering) of the blades in the event of a failure of the hydraulic system(s) controlling the pitch of blades attached to the hub 3. The axis of rotation of the hub is essentially horizontal, and the force of gravity will always be directly downward in a horizontally-mounted wind turbine. Large arrow 7 indicates the direction of rotation of the hub.

In the accumulator orientation depicted in FIG. 1, the accumulators experience what is essentially a tumbling head-over-tail rotation that may be expected to set up a lengthwise circulation path for hydraulic fluid in the accumulator. As shown in FIG. 2, such a circulation will tend to cause the fluid flow to be directed against the bladder at angles high enough to apply pressure and torque to the bladder surface.

FIG. 2 shows the interior of one of the accumulators shown in FIG. 1, oriented with its axis 12 within the plane of rotation of the hub. A flexible, resilient bladder 11 is inflated within the canister 10 through inflation valve 13. Hydraulic fluid is introduced into the canister through valve 16. In operation, valve 16 connects the accumulator to the hydraulic system. When oriented as shown in FIG. 2, the canister will rotate counterclockwise (as depicted by large arrow 7), and hydraulic fluid within the canister will be subject to forces that may cause the fluid to circulate as shown, impacting bladder 11 and causing a breakdown in the resilience of the bladder. The accumulator's movement is that of tumbling end over end within the plane of rotation of the hub.

In FIG. 2, the combination of the downward pull of gravity, the rotational movement of the hub, centrifugal, gyroscopic, and local coriolis forces cause hydraulic fluid 14 within the canister to circulate downward toward the end of the accumulator canister, and then back up and along the canister inner wall until the flow impacts the bladder 11. After long term continuous rotational movement, a portion of the bladder will have been continually subject to the impact and rotational torque of the fluid, and may weaken, rupture, or take on a more or less permanent twist. When this occurs, the accumulator loses its ability to retain energy when hydraulic system pressure is lost and catastrophic failure may occur.

Figure 3:
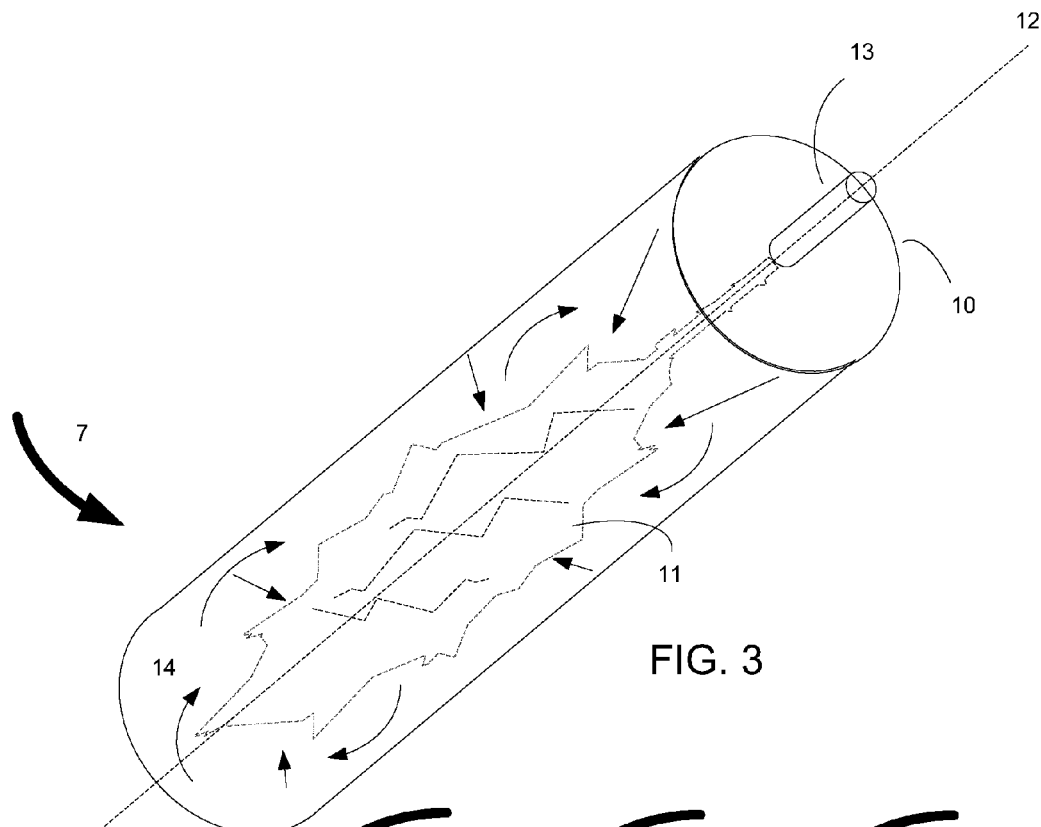
FIG. 3 depicts a prior art installation in which hydraulic fluid circulates within an accumulator whose longitudinal axis is oriented neither parallel to the axis of rotation of a hub, nor within the plane of rotation of the hub.

In some prior art installations, the hydraulic accumulators may be oriented such that their axes are neither parallel to the axis of rotation, nor fall within the plane of rotation as shown in FIGS. 1 and 2. An accumulator having such an orientation is depicted in FIG. 3. In this case, the accumulator's motion can be explained as tumbling end-over-end in the plane of rotation of the hub, and also tumbling end-over-end in a plane that coincides with the axis of rotation. In this complex motion, circulation of hydraulic fluid is less predictable, but still takes on lengthwise and circumferential flows within the canister that cause it to impact against the bladder, again imparting twisting and looping forces that cause the bladder to weaken and ultimately fail.

Figure 4:
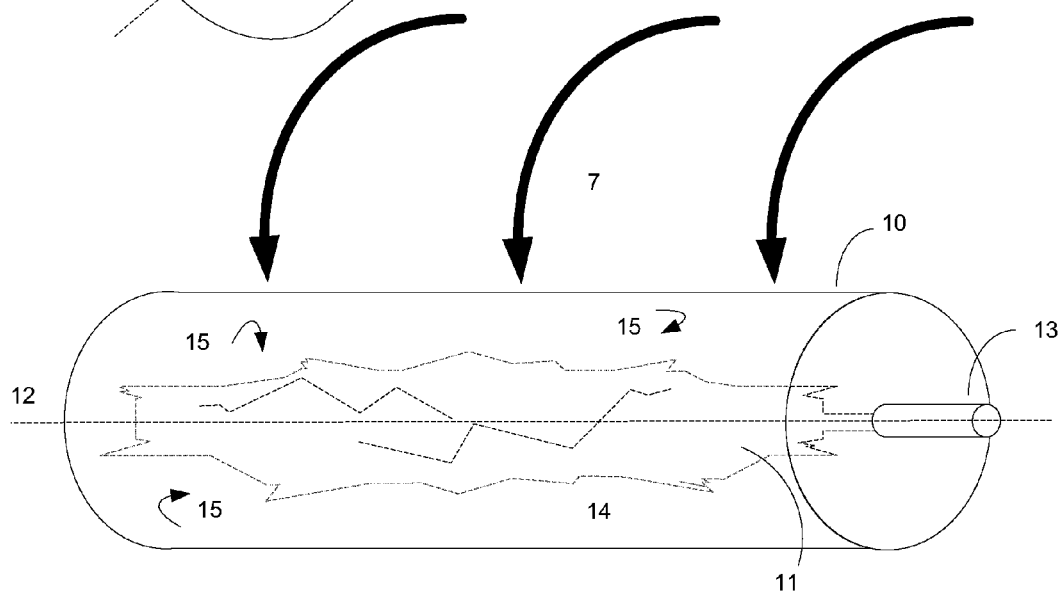
FIG. 4 shows an embodiment in which internal fluid movement in minimal when an accumulator is positioned within a hub in accordance with the method of this invention.

FIG. 4 demonstrates an embodiment of the invention in which the axis 12 of the accumulator 10 is parallel to the axis of rotation of the hub. As shown by large arrows 7, the canister is subject to rotation about the hub, but the movement is uniform on the canister and internal fluid, and the canister itself does not tumble. In this orientation, the rotational movement of the hub minimizes gyroscopic and coriolis forces on the canister, and, other than negligible random eddies 15, does not set up any significant circulation of internal hydraulic fluid 14. Although contact between moving hydraulic fluid 14 and the bladder 11 cannot be avoided, the orientation of the accumulator 10 minimizes sliding contact between the fluid and the bladder. As such, although the fluid contacts the bladder 11, it does not impart rotational forces to the bladder, and thereby subjects the bladder to significantly less stress, torque, and flexion than the fluid flow depicted in FIG. 2. This orientation of the accumulator may be expected to result in a significantly longer service life of the bladder before replacement will be required.

Figure 5:
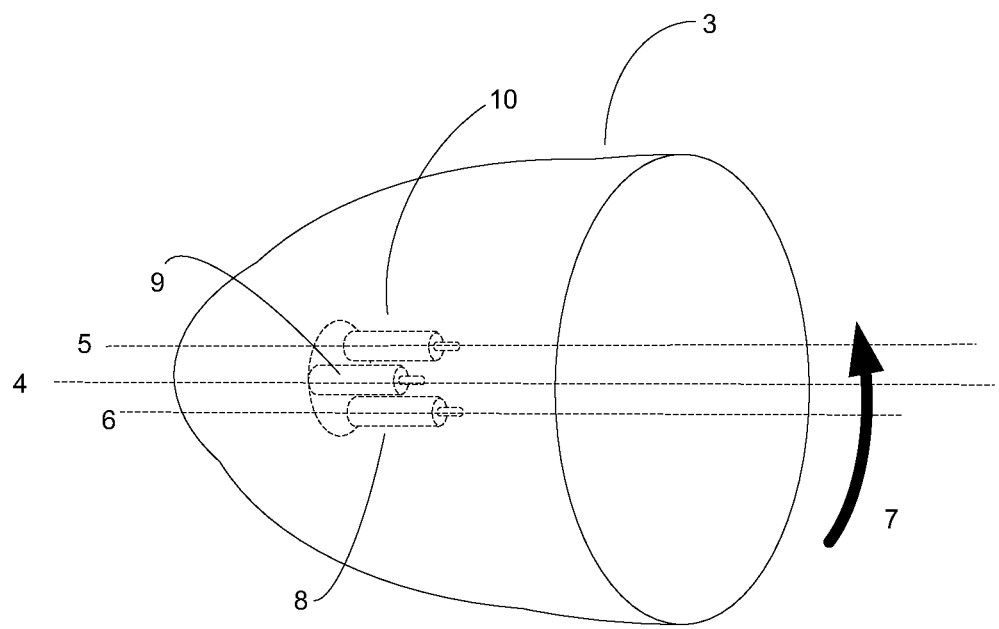
FIG. 5 shows a hub having accumulators oriented in accordance with an embodiment of the invention.

FIG. 5 shows a preferred embodiment of the invention in which accumulators 8, 9 and 10 are oriented with their respective longitudinal axes 4, 5 and 6 being substantially parallel to the axis of rotation of hub 3. In this orientation, the movement of hydraulic fluid in accumulators 8, 9 and 10 will be at a minimum, as shown in FIG. 4, and the bladders within the accumulators will have longer service lifetimes than with other mounting orientations.

Figure 6:
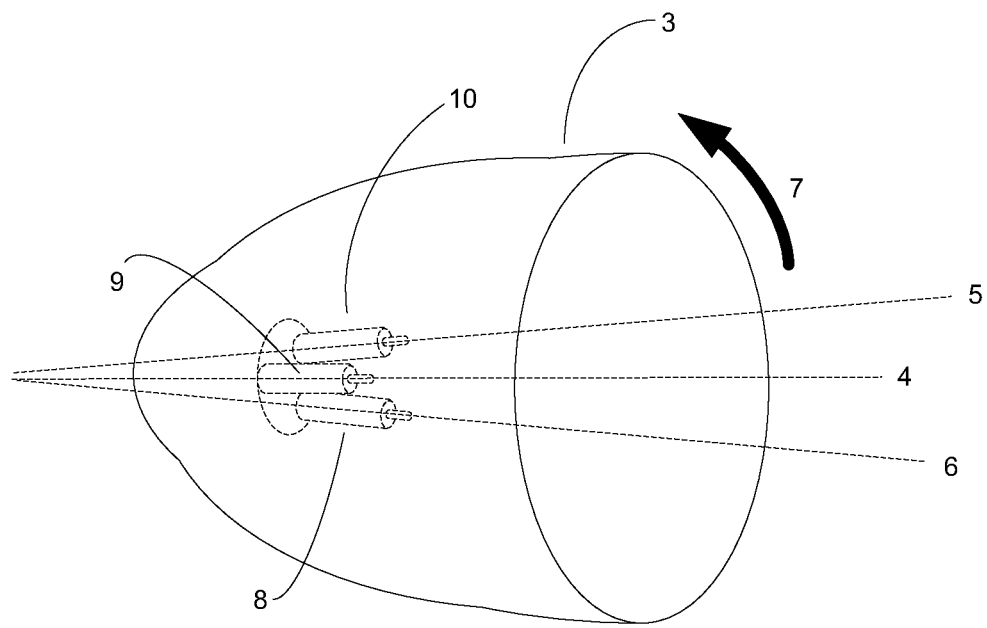
FIG. 6 shows a hub having accumulators oriented in accordance with an alternative embodiment of the invention.

FIG. 6 depicts an alternative embodiment of the invention, in which accumulators 8, 9 and 10 are mounted with their axes 4, 5 and 6 nearly, but not quite parallel to one another and to the axis of rotation of the hub 3. Bladder life may be increased when the accumulators are mounted at angles of up to 30 degrees to the axis of rotation of the hub, although smaller angles will further reduce internal fluid circulation and are preferable. As shown in FIG. 6, the longitudinal axes of the accumulators intersect with one another, and also with the axis of rotation of the hub. However, it is possible that accumulators may be mounted with their axes forming skew lines with one another or with the hub's axis of rotation, or both. Angles between skew lines are geometrically defined and angles of up to 30 degrees may be beneficial in extending the service life of embedded bladders. These embodiments would be utilized in conditions in which fully parallel mounting and orientation may not be possible. Despite a deviation from full parallelism, the embodiment depicted in FIG. 6 will perform substantially longer between mean failures than prior art accumulators, and will be a preferred embodiment where structural conditions do not permit mounting the accumulators with their axes parallel to the axis of rotation of the hub.

Also shown in FIGS. 5 and 6 is the mounting of accumulators relatively close to the axis of rotation of the hub. Other factors, such as the convenience of performing maintenance on the accumulators, may dictate the locations at which accumulators will be mounted. Wherever practicable, however, attention should be given to mounting them as close to the axis of rotation of the hub as possible, to further minimize the circulatory effects of centrifugal forces acting within the system.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. In a hub of a wind turbine having one or more hydraulic systems comprising hydraulic actuators to control the pitch of blades attached to said hub, and one or more hydraulic accumulators to provide hydraulic power in the event of a failure of one of said one or more hydraulic systems, each said accumulator further comprising a pressurized bladder, a method of minimizing hydraulic fluid flow within said one or more hydraulic accumulators comprising the steps of:

obtaining a hydraulic accumulator comprising a substantially cylindrical canister and a pressurized bladder, said pressurized bladder being longitudinally situated within said canister and being attached to one end of said canister;

orienting said hub to have an axis of rotation that is substantially horizontal;

mounting said accumulator within said hub such that the longitudinal axis of said accumulator is substantially parallel with the axis of rotation of said hub; and causing said hub to rotate.

2. The method claimed in claim 1 further comprising the step of situating said mounting proximate to said axis of rotation of said hub.

3. In a hub of a wind turbine having one or more hydraulic systems comprising hydraulic actuators to control the pitch of blades attached to said hub, and one or more hydraulic accumulators to provide hydraulic power in the event of a failure of one of said one or more hydraulic systems, each said accumulator further comprising a pressurized bladder, a method of controlling hydraulic fluid movement within said one or more accumulators comprising the steps of:

obtaining a hydraulic accumulator comprising a substantially cylindrical canister and a pressurized bladder, said pressurized bladder being situated within said canister and being attached to one end of said canister;

orienting said hub to have an axis of rotation that is substantially horizontal;

mounting said accumulator within said hub such that the longitudinal axis of said accumulator is substantially parallel with the axis of rotation of said hub; and causing said hub to rotate.

4. In a hub of a wind turbine having one or more hydraulic systems comprising hydraulic actuators to control the pitch of blades attached to said hub, and two or more hydraulic accumulators to provide hydraulic power in the event of a failure of one of said one or more hydraulic systems, each said accumulator further comprising a pressurized bladder, a method of reducing hydraulic fluid movement within said one or more accumulators comprising the steps of:

obtaining two or more hydraulic accumulators, each said accumulator comprising a substantially cylindrical canister and a pressurized bladder, said pressurized bladder being situated within said canister and being attached to one end of said canister;

orienting said hub to have an axis of rotation that is substantially horizontal;

mounting said two or more accumulators within said hub such that the longitudinal axis of each said accumulator forms an acute angle of between zero and 30 degrees with the axis of rotation of said hub; and causing said hub to rotate.

5. The method claimed in claim 4 further comprising the step of situating said two or more accumulators proximate to said axis of rotation of said hub.

6. The method claimed in claim 4 wherein the step of mounting two or more accumulators within said hub further comprises orienting each said accumulator such that the longitudinal axis of each said accumulator forms an acute angle of between zero and 20 degrees with the axis of rotation of said hub.

7. The method claimed in claim 4 wherein the step of mounting two or more accumulators within said hub further comprises orienting each said accumulator such that the longitudinal axis of each said accumulator forms an acute angle of between zero and 10 degrees with the axis of rotation of said hub.

* * * * *